United States Patent [19]

Milanowski et al.

[11] Patent Number: 5,363,466
[45] Date of Patent: Nov. 8, 1994

[54] ASSEMBLY OF HINGED FLAT MODULES

[75] Inventors: Michel Milanowski, Anserville; Alain Vincent, Juilly, both of France

[73] Assignee: Mars Actel, Vrigne Aux Bois, France

[21] Appl. No.: 21,171

[22] Filed: Feb. 22, 1993

[30] Foreign Application Priority Data

Feb. 21, 1992 [FR] France ................. 92 02031

[51] Int. Cl.⁵ ............................................. G02B 6/36
[52] U.S. Cl. ................................... 385/135; 385/134
[58] Field of Search ............................. 385/134, 135

[56] References Cited

U.S. PATENT DOCUMENTS

| | | | |
|---|---|---|---|
| 4,832,436 | 5/1989 | Goto et al. | 385/135 |
| 5,071,220 | 12/1991 | Ruello et al. | 385/135 |
| 5,138,688 | 8/1992 | Debortoli | 385/135 |
| 5,224,199 | 6/1993 | Cortijo | 385/135 |

FOREIGN PATENT DOCUMENTS

| | | |
|---|---|---|
| 0085911 | 8/1983 | European Pat. Off. |
| 2646928 | 11/1990 | France. |
| WO8905989 | 6/1989 | WIPO. |

Primary Examiner—Rodney B. Bovernick
Assistant Examiner—Hemang Sanghavi
Attorney, Agent, or Firm—Sughrue, Mion, Zinn, Macpeak & Seas

[57] ABSTRACT

The assembly of hinged flat modules includes a channel-section support on which the superposed modules are hinged by means of individual hinge coupling means. For each module, said hinge coupling means are constituted by a hinge element attached to and retained against a first edge of the module in question, and having a pair of hinge arms received on said channel-section support, and in that the assembly further includes locking elements, each of which is attached to and retained against the opposite edge of the respective module. Application: an assembly of optical cassettes.

8 Claims, 5 Drawing Sheets

ASSEMBLY OF HINGED FLAT MODULES

The present invention relates to assembling superposable modules together to form an assembly, the modules being made accessible in said assembly by opening the modules about respective hinge axes provided for them. The invention relates to such an assembly of stacked and hinged modules, in which assembly said modules are more specifically cassettes for coiling and optionally interconnecting optical fibers.

BACKGROUND OF THE INVENTION

Such cassettes are housings for coiling and protecting optical fibers, and often also for protecting connections or "splices" between the coiled optical fibers. Such cassettes are used for connecting various optical cables together, or for connecting an optical cable to optical jumpers. Each cassette is assigned to two fibers to be connected together, or preferably to several fibers to be respectively connected to several other fibers.

In general, a plurality of cassettes are assigned to handling all the fibers of one or more optical cables to be connected to one or more other optical cables or jumpers inside a splice box. The cassettes are stacked together to form an assembly so as to take up less space inside the splice box, and they are hinge mounted so that each of them can be accessed, in particular for maintenance purposes.

Document FR-A- 2,646,928 (corresponding to U.S. Pat. No. 5,071,220 to Ruello dal.) describes such an assembly of cassettes inside a splice box for optical fibers. In that document, the assembly of cassettes is mounted at the end of a support plate on which the ends of the cables to be interconnected are fixed. The support plate has side flanges to delimit a protected space in which to transfer the fibers to the assembly of cassettes, surplus lengths being left on the fibers at the ends of the cables.

In that assembly, the cassettes are stacked such that they are slightly offset from one another, and are hinged about individual axes that are similarly offset from one another. To that end, each of the cassettes carries a pair of side arms that swing about a pair of hinge axes on the side flanges of the support plate. Each cassette has a limited possible rotary stroke through which to rotate relative to the plane of the support plate, so that the cassette can be put into the open position transversely to the support plate. Temporary snap-fastening means are provided at the coupling between each pair of arms and the corresponding pair of hinge axes to limit said rotary stroke, and to define an open position.

Such dispositions for coupling and opening the cassettes are difficult to mount, and in particular make the cassettes unstable while they are being opened or when they are open.

OBJECT AND SUMMARY OF THE INVENTION

An object of the present invention is to improve the mechanical strength of the individual modules making up an assembly of hinged flat modules, of the type of the above-mentioned assembly of cassettes.

The invention provides an assembly of hinged flat modules, said assembly including a channel-section support formed by a web and two side flanges, flat modules superposed on one another facing said channel-section support and parallel to said web, with a "hinge" offset between their "first" edges situated facing the channel-section support, and individual hinge coupling means for hinge coupling said modules on said flanges, thereby defining individual hinge axes which are stepped and offset over the height of said flanges, wherein, for each module, said hinge coupling means are constituted by a hinge element firstly having its "rear" face provided with first assembling and retaining means for assembling and retaining said hinge element directly against and substantially over the height of the "front" face of said first edge, and secondly having a pair of hinge arms projecting from the opposite "front" edge and received on said flanges of the channel-section support, and wherein, on its "front" face, said first edge has second assembling and retaining means which are complementary to said first means.

The assembly further has at least one of the following additional features:

said first means are a pair of side latches and/or a rear recess on the hinge element, and the second means are a pair of guide catches and/or retaining fingers on the first edge;

the edge that is opposite from said first edge is organized identically to the first edge;

each module receives a locking element on the edge opposite from said first edge, the locking element having assembling and retaining means that are identical to said first means, and snap-fastening catches and "complementary" openings for such snap-fastening catches, for locking the locking element to the identical locking element on either of the modules that are adjacent to the module carrying the locking element in question;

said modules are cassettes for coiling and interconnecting optical fibers; and each of the cassettes has four possible accesses for said fibers, the accesses being situated substantially at the ends of said first edge and of the opposite edge of the cassette, and receives said fibers via those two accesses of the four possible accesses which are on the edge opposite from said first edge carrying the hinge element.

BRIEF DESCRIPTION OF THE DRAWINGS

The characteristics and advantages of the present invention appear from the following detailed description of embodiments given with reference to the accompanying drawings, in which.

MORE DETAILED DESCRIPTION

Figure 1:
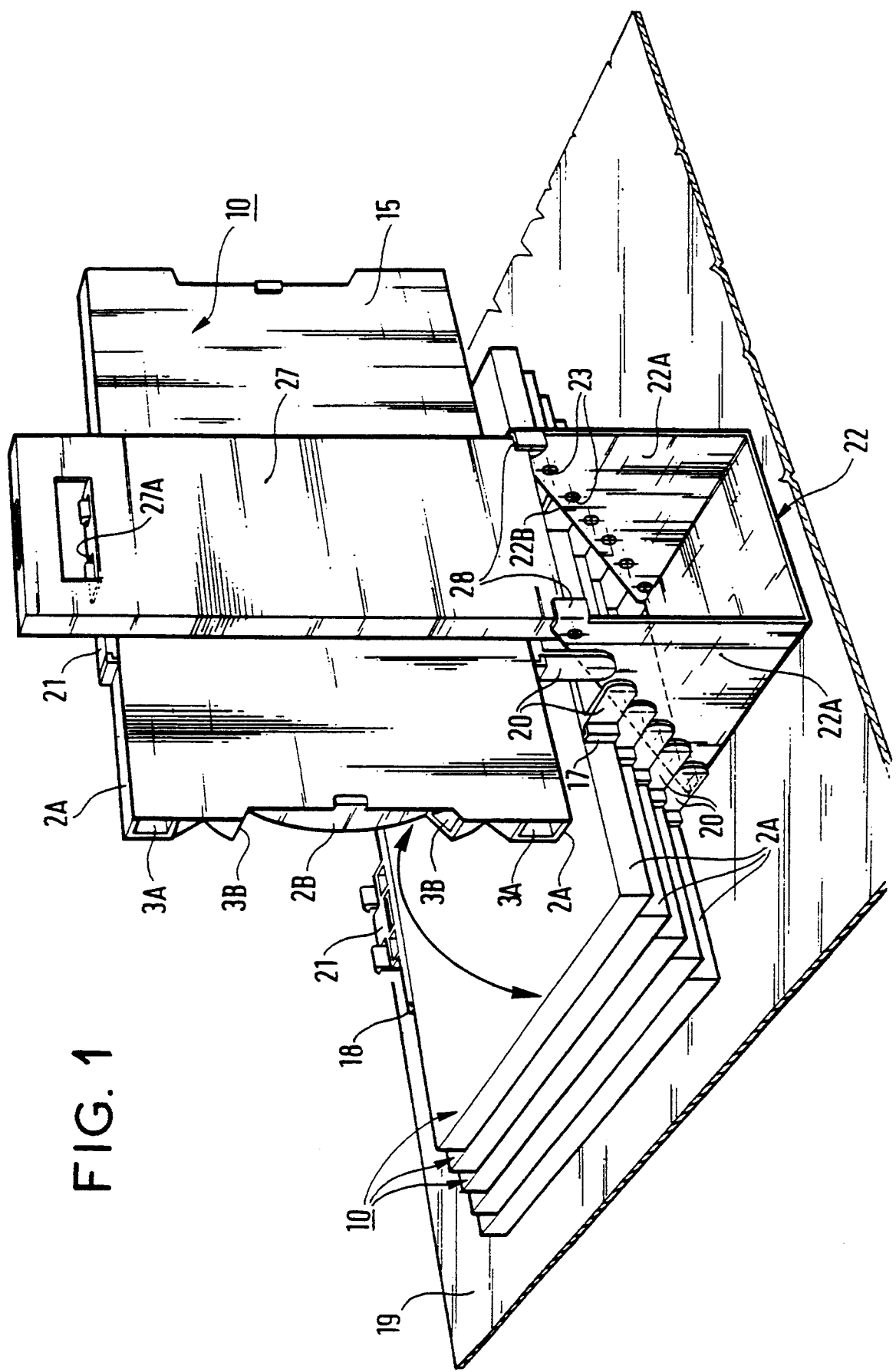
FIG. 1 is a diagrammatic perspective view of an assembly of cassettes of the present invention, shown with one of the cassettes in an open position.

The assembly of hinged flat modules of the invention is constituted in particular by cassettes 10 for optical fibers, the cassettes being identical to one another. The modules may be flat housings other than optical cassettes, the flat housings being assembled to form an assembly of housings in accordance with the present invention.

The cassette 10 is described with reference to FIG. 2. It includes a substantially rectangular flat bottom 1 having its small sides partially truncated and curved. Two straight opposite rim segments 2A and two curved other opposite rim segments 2B surround the bottom. Four "double" accesses 3 for the fibers received in the cassette are delimited between the end portions of the rim segments on the bottom and at the four corners thereof.

Blocks 4 projecting from the bottom 1, each block being centered in a respective double access, divide each of said double accesses into two access channels 3A and 3B. The blocks are of the same height as the rim segments, and are substantially triangular in cross-section. Side faces 4A and 4B on each block face the end portions of the rim segments in the corresponding double access, and the sides of the corresponding access channels are delimited by the faces and the end portions. An extension 4C on each block extends its side face 4B facing the end portion of the rim segment 2B towards the outside of the cassette.

Tabs 5A on rim segments 2A, and tabs 5B on rim segments 2B extend parallel with the bottom 1 towards the inside of the cassette. Two other tabs 5C which are analogous to tabs 5A project from the bottom substantially to one side of the middle longitudinal axis thereof. The tabs 5A, 5B, 5C serve to hold the fibers coiled inside the cassette underneath them.

The bottom 1 is made of plastic and is molded. The rim segments, the blocks, and the tabs are obtained during molding of the bottom.

The bottom 1 is equipped both with a support 6 for receiving and holding optical fiber connections such as 16 thereon, and with a cylinder 7 for coiling the fibers. The support and the cylinder are removably mounted side-by-side over the width of the bottom on its middle portion. To this end, the support and the cylinder have respective sets of snap-fastening catches, the set on the support being formed by a resilient catch 6B on one edge thereof, and two rigid other catches on the opposite edge thereof, and the set on the cylinder being formed by one rigid catch 7A and one or two resilient other catches 7B. The bottom in turn has sets of openings (not referenced) corresponding in particular to the respective sets of catches on the cylinder and on the support, for the purposes of snap-fastening them thereon.

Figure 2:
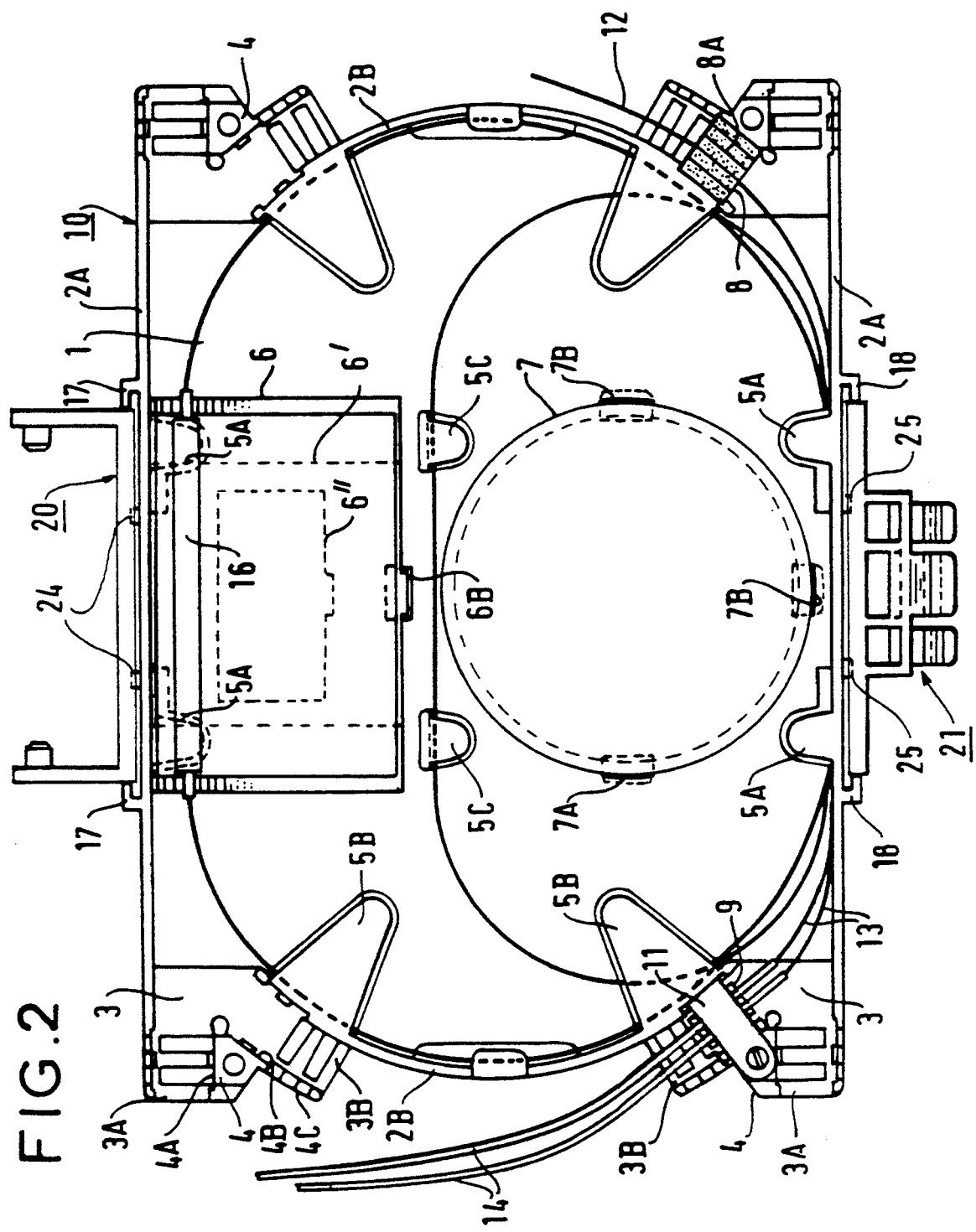
FIG. 2 is a plan view of one of the cassettes in the assembly, shown without a closing cover.
Figure 3:
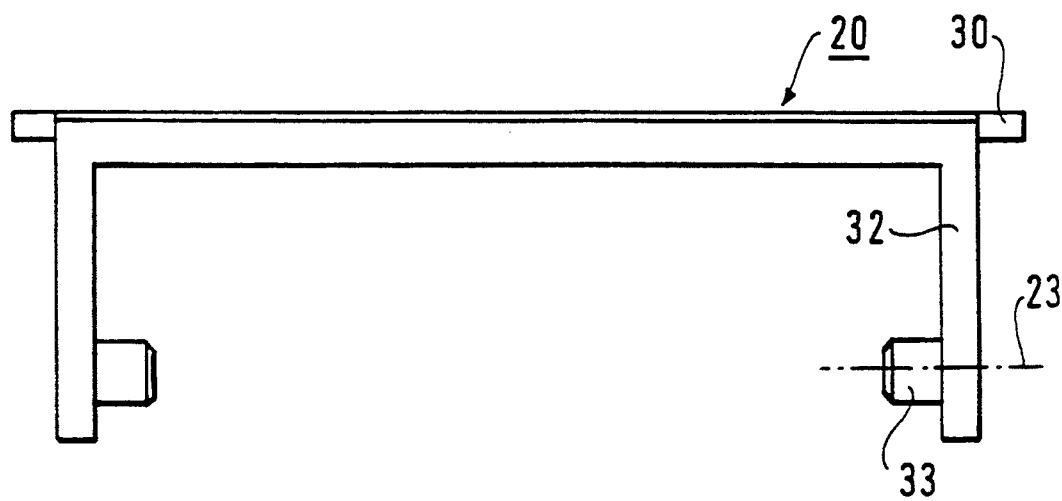
FIG. 3 is a plan view of a "hinge" element of one of the cassettes in said assembly.
Figure 4:
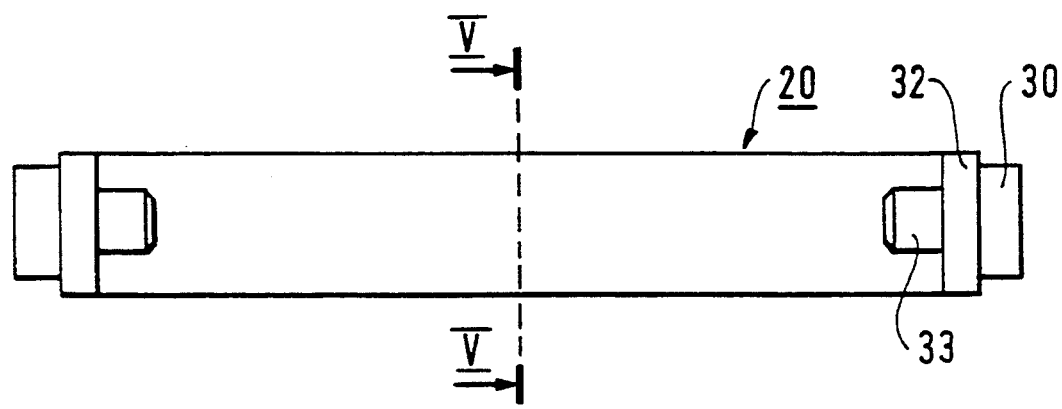
FIG. 4 is a front view of the hinge element shown in FIG. 3.
Figure 5:
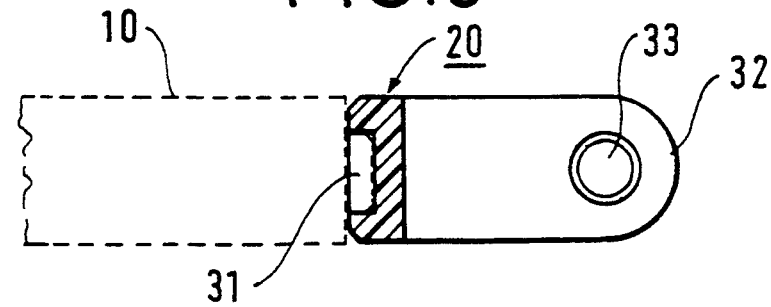
FIG. 5 is a view in section through the hinge element, the section being taken on line V—V in FIG. 4.
Figure 6:
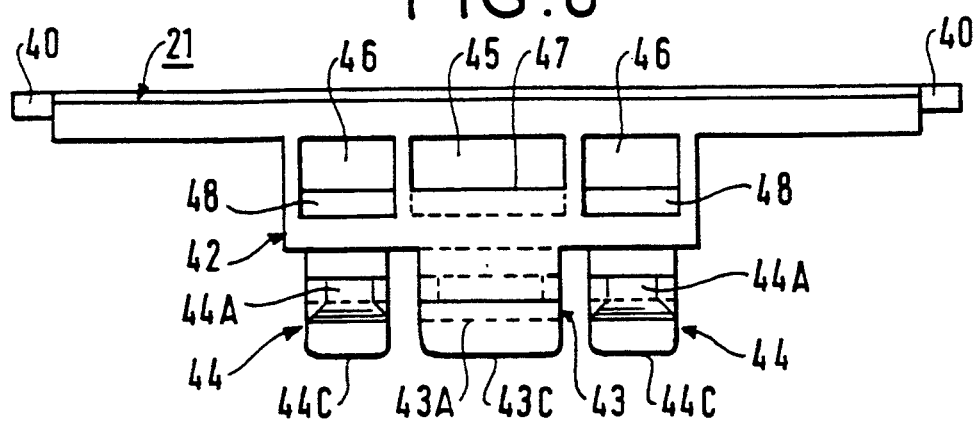
FIG. 6 is a plan view of a "locking" element of one of the cassettes in said assembly.
Figure 7:
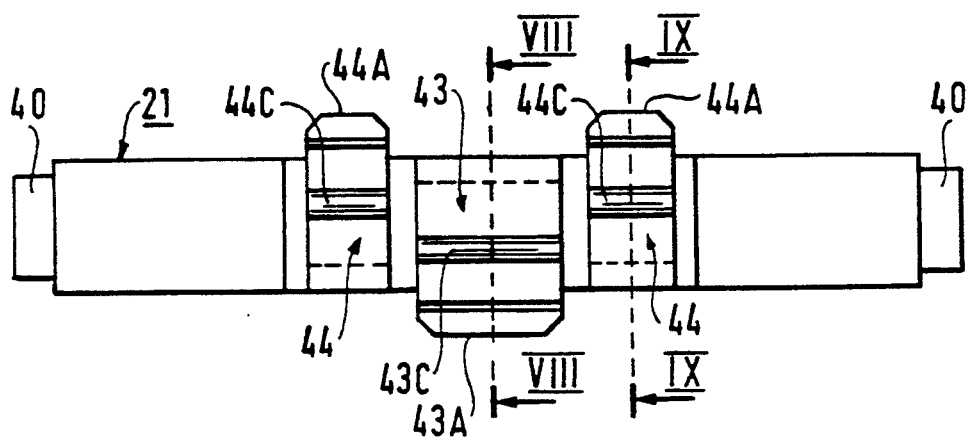
FIG. 7 is a front view of the locking element shown in FIG. 6.

The connection support is selected from different possible supports for different connections, comprising the above-mentioned support 6 and other supports 6' and 6" (FIG. 2). Optionally, the above-mentioned cylinder 7 is not used, in which case two supports 6, 6', 6" may be mounted on the bottom. Different sets of openings are initially provided on the bottom for selectively mounting the various elements 6, 6', 6", and 7 on the bottom, and for adapting the resulting cassette as required. The tabs 5A and 5C may be removed if necessary, to adapt the cassette to requirements.

On the cassette 10, two of the four double accesses 3 are selected, as is one of the two access channels 3A and 3B in each selected double access, as a function of how the cassette is used, thereby ensuring that the radius of curvature of the fibers entering the cassette does not drop below a minimum.

The two selected access channels are in turn equipped with an element of a first type 8 and/or an element of a second type 9, for individually separating in line and holding the fibers received thereby.

The element of the first type 8 is assigned to bare fibers 12, and is constituted by a flexible slab which can be mounted and locked in an arbitrary one of the access channels. The slab has a series of slots 8A disposed side-by-side over the width of the access channel in which it is mounted and locked.

The element of the second type 9 is assigned to fibers 13 that are initially protected inside individual sheathing tubes 14. The element of the second type is constituted by a channel-section part having its facing flanges formed by respective series of teeth. The teeth delimit slots between one another, the slots on one flange facing the slots on the other flange and being disposed side-by-side over the width of the arbitrary access channel in which the element is mounted and locked. A tab 11 that is independent from the element 9 and from the bottom 1 is associated with the element. The tab is fixed via one of its ends to the block 4, and it extends over the element 9 to ensure that the tubed fibers are retained in the slots therein. In a variant, the tubed fibers may be retained in the access channel by means of a collar (not shown).

A cover 15 (FIG. 1) attached to the rim segments 2A, 2B closes the cassette 10 and protects the equipment on the bottom thereof, and the selected and equipped access channels.

For the purpose of hinge mounting it and locking it in the assembly shown in FIG. 1, the cassette 10 further includes a pair of guide catches 17, 18 on each of the rim segments 2A. The pairs of guide catches project from the outside faces of and over the height of the rim segments 2A. The catches in each pair are bracket shaped, they face each other, and they are symmetrical about the middle transverse axis of the cassette.

With reference to FIG. 1 or FIG. 2, it can be observed that the assembly of cassettes is formed on a plane base support 19. Each cassette is hinge mounted by means of an individual hinge element 20 fixed against one of the two rim segments 2A, between the guide catches 17 or 18 on that rim segment. A "locking" element 21 for locking the cassettes together is fixed against the other one of the rim segments 2A of each cassette, between the guide catches 18 or 17 on that rim segment.

The individual elements 20 are received in a rigid channel-section support 22 for supporting hinges 23. Those edges 22B of the flanges 22A of the support which face the cassettes slope at 45° to the web of the support. The hinge axes 23 delimited between each of the flanges 22A are stepped over the height thereof at the same pitch as the superposed cassettes, and are offset along a line parallel to the edges 22B. The cassettes have the same offset between their rim segments 2A.

The channel-section support 22 is fixed to the base support 19. The first cassette on the bottom of the stack is preferably secured to the base support and rendered fixed relative thereto, in a "closed" position.

A pair of retaining fingers 24 or 25 project from the outside face of each rim segment 2A. Each pair of fingers is disposed between the guide catches in the corresponding pair of guide catches 17 or 18. Each pair of fingers enables the hinge element 20 or the locking element 21 to be retained thereagainst, when the element is mounted in the guide catches in question.

With reference to FIG. 2, it is easy to understand that the four double accesses at the four corners of the cassette and the two access channels in each of the double accesses make it possible to select two access channels for the fibers, which access channels are in turn part of two of the double accesses which are in turn selected. In the same way, hinge mounting each cassette in the assembly along one of its rim segments 2A, and locking it along the other rim segment are also performed selectively. Hinge mounting is performed on that one of rim segments 2A to which the two selected double accesses 3 do not belong, when the fibers enter the access channels 3A or 3B of the selected accesses along rim segments 2B.

In this way, the hinge axis of each cassette in the assembly is at a distance from the two selected double accesses, which distance is substantially equal to the width of the cassette. As a result, the fibers, which are also retained in each selected access channel, are not subjected to an excessive amount of curvature or stress when the cassette is being opened in the assembly of cassettes.

FIG. 1 also shows that a work plate 27 is associated with the cassettes in the assembly, and is mounted on the top end cassette. The work plate is received and hinged on the flanges of the channel-section support 22, and is locked on the locking element 21 mounted on the top cassette. Two abutments 28 on the flanges of the channel-section support 22 delimit the maximum open position for the work plate, substantially at 90° to the base support 19. The abutments therefore delimit the open positions for the successive cassettes against one another and against the work plate.

The functions of the individual hinge elements 10 are described with reference to FIGS. 2 to 5, and to FIG. 1 or 2. The length of each hinge element is equal to the distance between the guide catches 17 or 18 on the cassettes, and the height of each hinge element is substantially equal to the height of the rim segments 2A. The hinge element includes:

a pair of side latches 30 received in the pair of guide catches 17 of the cassette, so that the rear face of the hinge element touches the rim segment 2A of the cassette;

a rear recess 31, in which the pair of retaining fingers 24 are received and locked;

a pair of front arms 32 almost at the ends of the hinge element and projecting from the front face thereof; and a pair of cylindrical fingers 33 facing each other on the inside faces of the arms and close to the ends thereof, the cylindrical fingers being fixed to the arms and delimiting one of the hinge axes on the channel-section support 22.

The hinge elements 21 couple the cassettes in the assembly to the channel-section support. The coupling is strengthened by the locking elements 21 on the opposite rim segment 2A.

The functions performed by the individual locking elements 21 are described with reference to FIGS. 6 to 9 and FIG. 2. The length of each locking element is the same as that of each hinge element 20. Each locking element has the same dispositions as each of the hinge elements so that it can be mounted on either one of rim segments 2A of any one of the cassettes. The dispositions are a pair of side latches 40 received in the pair of guide catches 18, and a rear recess 41 receiving the pair of retaining fingers 25 which are locked therein.

For the purposes of locking the cassette that carries it to either or both of the two adjacent cassettes, and of reinforcing the cassettes in the assembly, the locking element 21 in question has a middle portion 42 of much greater thickness projecting from the front face of the locking element. A central snap-fastening catch 43 is delimited on the middle portion 42 and projecting from one of the edges (in this case, the bottom edge) of the middle portion and of the element, and two "side" snap-fastening catches 44 are delimited on the middle portion and projecting from the other edge (in this example, the top edge) of the middle portion and of the element. Each of the snap-fastening catches has a hooked end tooth referenced 43A or 44A depending on the catch, which tooth faces forwards. A central opening 45 and two side openings 46 over the height of the middle portion correspond to the snap-fastening catches. Also corresponding to the snap-fastening catches, there is a fastening hook 47 on the top face, which hook extends the base of catch 43 and projects into the central opening 45, and two fastening hooks 48 on the bottom face, which hooks extend the bases of catches 44 and project into openings 46.

A recess 43B situated to the rear of catch 43 and open on the bottom face of the element, and a recess 44B situated to the rear of each of catches 44 and open on the top face of the element give the required resilience to the individual snap-fastening catches. Individual front levers 43C or 44C, depending on the catches, are integral with the catches. The levers enable the catches to be actuated to release them from either one of the adjacent identical locking elements.

Naturally, inverted dispositions, in particular corresponding to the central snap-fastening catch projecting from the top front edge, are equivalent to the above-described dispositions.

Figure 10:
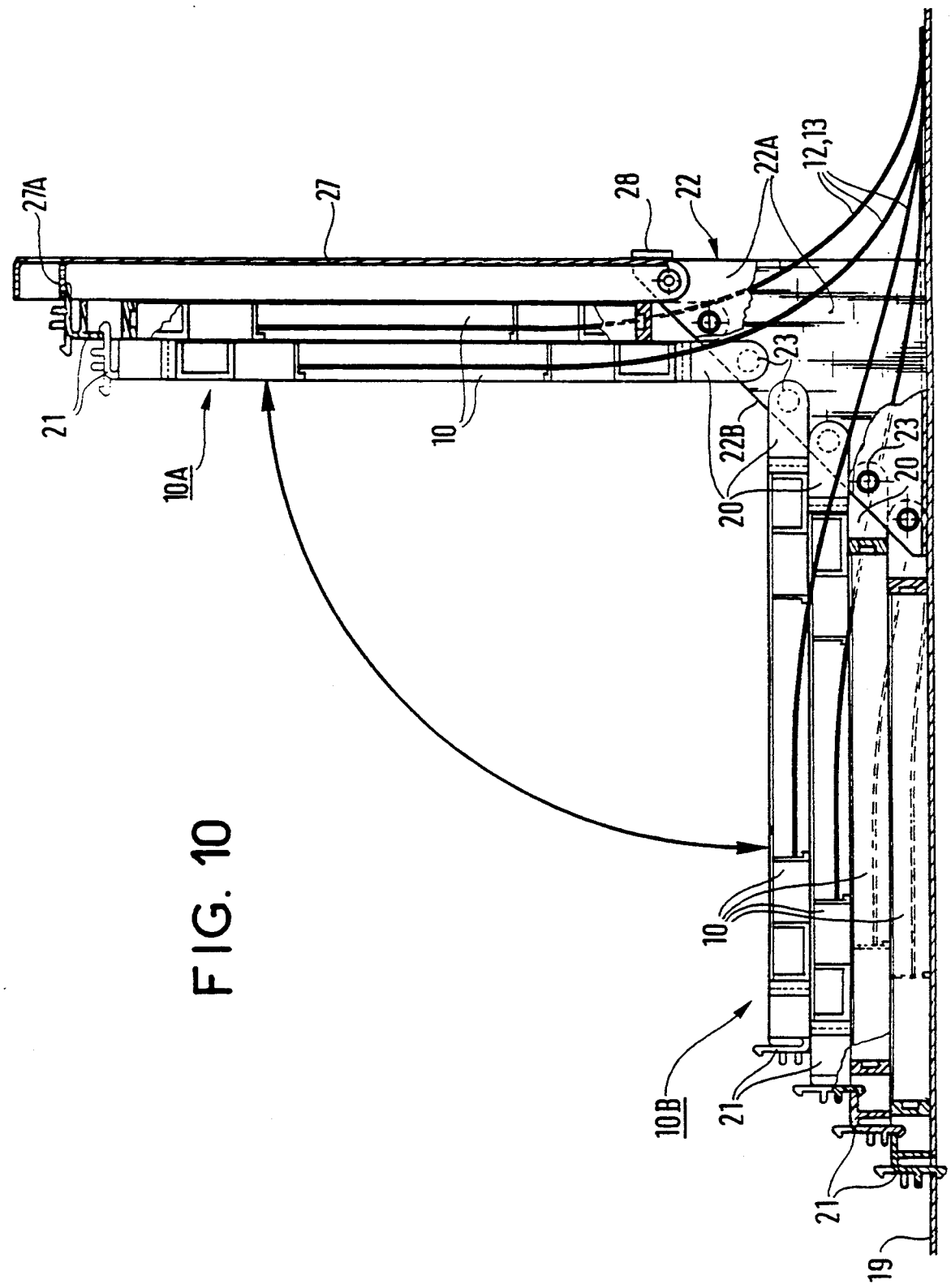
FIG. 10 is a partially cutaway side view of the assembly of cassettes shown in FIG. 1, with some of the cassettes being in the open position.

FIG. 10 clearly shows the resulting hinged assembly, and the way in which the cassettes are made stable, regardless of whether they are in the open position or in the closed position. A group 10A of top cassettes 10 are shown in the open position against the work plate 27, which is in the same open position, and a group 10B of bottom cassettes are shown in the closed position on the base support 19.

Figure 8:
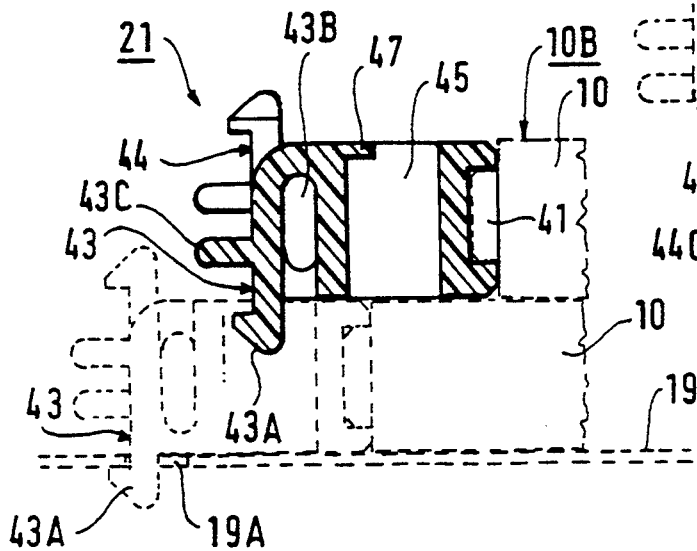
FIGS. 8 and 9 are views in section through the element shown in FIG. 7, the sections being taken on lines VIII—VIII and IX—IX, showing how the element co-operates with another identical adjacent element.
Figure 9:
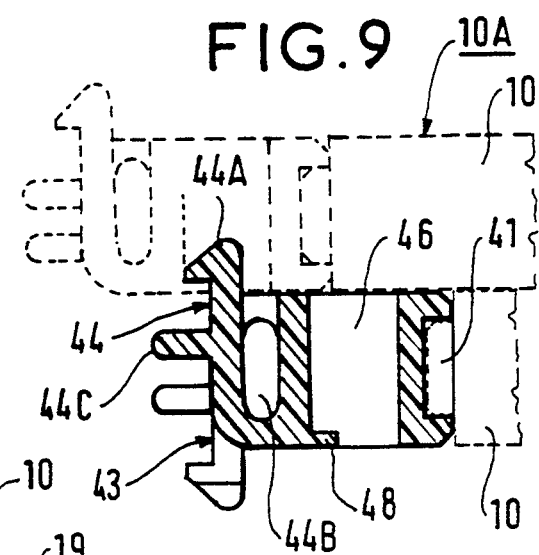

The first cassette, at the bottom of the assembly and of the group 10B is held relative to the base support 19 by its hinge element 20 and its opposite locking element 21. With reference also to FIG. 8, it can be observed that the central snap-fastening catch 43 of the locking element 21 is received and locked in a corresponding opening 19A provided in the base support. The cassettes in the same group 10B are secured to one another on one side by means of their individual hinge elements 20 and the channel-section support 22 and on the opposite other side by means of their individual locking elements 21 which are locked to one another.

Similarly, in the group 10A of cassettes in the open position, the top end cassette is held relative to the base support 19 and to the work plate 27 by means of its hinge element on the channel-section support 22 on one side, and is locked to the work plate by means of its locking element on the opposite other side. The work plate is a plane plate with its side edges and its front edge folded down. It has two openings 27A in its front folded-down edge, in which openings the snap-fastening catches 44 of the locking element of the end cassette are received and fastened.

The work plate is locked to the end cassette in the same way when all the cassettes and the work plate are in the closed position.

In the group 10A of cassettes in the open position, the cassettes are locked to one another by means of their individual elements 21.

The individual levers enable the locking elements to be released from one another to move the cassettes from one group to the other.

In the assembly, the rear face of each hinge element is firmly pressed and directly retained against the cassette in question and over the height thereof. Such an element enables short links to be delimited between the cassette and its hinge axis, and provides excellent strength and stability for the cassette during opening or closing.

The elements 20 and 21 are molded. They are not mechanically fragile. Mounting them on the cassettes is easy and quick, and they make it possible to choose the hinge side of each cassette. They also enable the cassettes equipped with them to be assembled easily and quickly to form the resulting assembly. It should also be noted that, in the assembly, the channel-section support 22 is relatively narrow compared with the cassettes, and is assigned to the hinges of the cassettes only. The fibers arrive via the outside of the flanges of the channel-section support and via the small sides of the cassettes, and enter the cassettes via the equipped accesses situated on the locking side and not on the hinge side. The fibers are therefore not subjected to much bending when the cassettes are being opened.

We claim:

1. An assembly of hinged flat modules, said assembly including a channel-section support formed by a web and two side flanges, flat modules superposed on one another facing said channel-section support and parallel to said web, with a hinge offset between first edges thereof situated facing the channel-section support, and individual hinge coupling means for hinge coupling said modules on said flanges, thereby defining individual hinge axes which are stepped and offset over the height of said flanges, wherein, for each module, said hinge coupling means are constituted by a hinge element having a rear face provided with first assembling and retaining means for assembling and retaining said hinge element directly against and substantially over the height of a front face of said first edge, and having a pair of hinge arms projecting from an opposite front face and received on said flanges of the channel-section support, wherein, said front face of said first edge has second assembling and retaining means which are complementary to said first means; said assembly further comprising individual locking elements on the modules, and means for locking each of the locking elements onto each adjacent locking element in said assembly; and wherein said modules are cassettes for coiling and interconnecting optical fibers, and each of said cassettes has four corners with an access for fibers at each corner.

2. An assembly according to claim 1, wherein said first means include a pair of side latches on the rear face of said hinge element, and said second means include a pair of guide catches projecting from the front face of said first edge, and receiving the pair of side latches of the hinge element.

3. An assembly according to claim 1, wherein said first means and said second means include at least one retaining finger and one recess for receiving said finger, one on the front face of said first edge and the other on the rear face of said hinge element.

4. An assembly according to claim I, wherein the edge opposite from said first edge of each module has second assembling and retaining means identical to those of said first edge, so that either edge of the module can be selectively disposed facing said channel-section support.

5. An assembly of hinged flat modules for coiling and interconnecting optical fibers, said assembly including a channel-section support formed by a web and two side flanges, flat modules superposed on one another facing said channel-section support and parallel to said web, with a hinge offset between first edges thereof situated facing the channel-section support, and individual hinge coupling means for hinge coupling said modules on said flanges, thereby defining individual hinge axes which are stepped and offset over the height of said flanges, wherein, for each module, said hinge coupling means are constituted by a hinge element having a rear face provided with first assembling and retaining means for assembling and retaining said hinge element directly against and substantially over the height of a front face of said first edge, and having a pair of hinge arms projecting from an opposite front face and received on said flanges of the channel-section support, and wherein, said front face of said first edge has second assembling and retaining means which are complementary to said first means;

wherein the edge opposite from said first edge of each module has second assembling and retaining means identical to those of said first edge, so that either edge of the module can be selectively disposed facing said channel-section support;

said assembly further including individual locking elements on the modules, each locking element having third assembling and retaining means on a rear face of said locking element, the third means being identical to the first means and being mounted on the second means of the edge opposite from said first edge of each module snap-fastening catches on a front face of the locking element, a central one of the catches projecting from one edge of each locking element, and other side ones of the catches projecting from the other edge thereof, and openings behind the snap-fastening catches and fastening hooks inside the respective openings for locking one of the individual locking elements onto each adjacent locking element in said assembly.

6. An assembly according to claim 5, further including a plane base support on which the first module at the bottom of the assembly is fixed by means of the locking element mounted on said first module.

7. An assembly according to claim 5, further including a top plate mounted on the last module in the assembly and hinged on said flanges of the channel-section support, abutments on said channel-section support defining a fully-open position for said plate, and fastening means for fastening the locking element of said last module onto said plate.

8. An assembly according to claim 5, wherein each of said cassettes has four possible accesses for said fibers, the accesses being situated substantially at the ends of said first edge and of the opposite edge of the cassette, and receives said fibers via those two accesses of the four possible accesses which are on the edge opposite from said first edge carrying the hinge element.

* * * * *